(12) United States Patent
Wang

(10) Patent No.: US 7,319,647 B2
(45) Date of Patent: Jan. 15, 2008

(54) METHOD, OPTICAL DISK DRIVE AND CALIBRATION SYSTEM FOR MODIFYING A 2T WRITE STRATEGY TO IMPROVE RECORDING QUALITY

(75) Inventor: Che-Chieh Wang, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 492 days.

(21) Appl. No.: 10/711,881

(22) Filed: Oct. 12, 2004

(65) Prior Publication Data

US 2005/0111322 A1 May 26, 2005

(30) Foreign Application Priority Data

Nov. 20, 2003 (TW) ............... 92132550 A

(51) Int. Cl.
*G11B 7/00* (2006.01)
(52) U.S. Cl. .................. 369/47.53; 369/59.11
(58) Field of Classification Search ............ 369/47.53, 369/59.11
See application file for complete search history.

(56) References Cited

U.S. PATENT DOCUMENTS

| | | | |
|---|---|---|---|
| 6,324,143 B1 * | 11/2001 | Fukuda | 369/59.11 |
| 6,982,939 B2 * | 1/2006 | Powelson et al. | 369/47.53 |
| 2002/0126604 A1 * | 9/2002 | Powelson et al. | 369/47.53 |
| 2005/0219983 A1 * | 10/2005 | Noda | 369/59.11 |
| 2006/0062117 A1 * | 3/2006 | Noguchi et al. | 369/47.53 |

FOREIGN PATENT DOCUMENTS

JP    P2003-85751 A    3/2002

OTHER PUBLICATIONS

JP 2003-085751 (translation) Kato Tatsuya Mar. 20, 2003.*

* cited by examiner

*Primary Examiner*—Wayne Young
*Assistant Examiner*—Van T. Pham
(74) *Attorney, Agent, or Firm*—Winston Hsu

(57) ABSTRACT

A method, an optical disk drive and a calibration system for modifying a 2T write strategy to improve recording quality. The method includes driving the optical disk drive for burning a test odd mark and a test even mark on an optical disk, detecting signal waveforms associated with the test odd mark and the test even mark, adjusting a plurality of writing periods used for forming an even mark according to the signal waveform of the test even mark, and adjusting a plurality of writing periods used for forming an odd mark according to the signal waveform of the test odd mark without utilizing the adjusted writing periods for the even mark.

17 Claims, 5 Drawing Sheets

METHOD, OPTICAL DISK DRIVE AND CALIBRATION SYSTEM FOR MODIFYING A 2T WRITE STRATEGY TO IMPROVE RECORDING QUALITY

BACKGROUND OF INVENTION

1. Field of the Invention

The present invention relates to an optical disk drive and a method and a calibration system for setting its write strategy, and more particularly, to a method, a CR-RW drive and a calibration system for adjusting a 2T write strategy to improve recording quality.

2. Description of the Prior Art

As the calculation capability of computers becomes faster and faster and as network technology development progresses rapidly, demand for mass storage devices is rapidly increasing. Devices utilizing optical storage media such as CD-R's (compact disk-recordable) are preferred for such kinds of storage as this media type is more inexpensive, compact, and portable than other types with respect to the same storage capacity. As various kinds of optical disk drives and burners appear with faster speed and more reliable operation, optical disk drives and burners have practically become standard accessories of personal computers. For example, a CD-RW (CD-ReWritable) drive is capable of writing data to a CD-RW disk and erasing the data recorded from the CD-RW disk, thus facilitating data storage for the users.

Generally, when an optical disk drive writes data to an optical disk, the data is transformed into a storage format of the optical disk using an encoder of the optical disk drive. In the prior art, the data transformation is usually referred to an Eight-to-Fourteen Modulation (EFM), which encodes the data to be stored in the optical disk using a square wave of various pulse-widths and intervals along a time axis. The encoded EFM data is recorded onto the optical disk using the optical disk drive. A recording layer within the CD-RW disk is formed of phase-change materials. An optical pick-up unit (OPU) of the CD-RW drive outputs a laser beam onto a predetermined location of the CD-RW disk and activate the portion of the phase-change materials at the predetermined location into an amorphous state or a crystalline state. Since the phase-change materials have different refractive indices respectively in the amorphous state and in the crystalline state, an optical method can be used to distinguish these two states.

The optical pick-up unit of the CD-RW drive mainly provides a bias power $P_{bias}$, an erase power $P_{erase}$, and a write power $P_{write}$. The write power $P_{write}$ is greater than the erase power $P_{erase}$, and the erase power $P_{erase}$ is greater than the bias power $P_{bias}$. When the CD-RW erases data from the CD-RW disk, the optical pick-up unit of the CD-RW drive outputs the erase power $P_{erase}$ to heat the CD-RW disk and transform the portion of the heated phase-change materials into the crystalline state. When the CD-RW drive writes data onto the CD-RW disk, the optical pick-up unit of the CD-RW drive outputs the write power $P_{write}$ to heat a specific location of the CD-RW disk and followed by outputting the bias power $P_{bias}$ to cool the CD-RW disk. As a result, the specific location of the CD-RW disk is transformed into an amorphous state and indicates a first logic value "1". On the contrary, if the optical pick-up unit outputs the erase power $P_{erase}$ to heat the specific location of the CD-RW disk, the specific location is transformed into a crystalline state and indicates a second logic value "0".

FIG. 1 is a function block diagram of a CD-RW drive 10 according to the prior art. The CD-RW drive 10 comprises an optical pick-up unit 12, a power control unit 14, a controller 16 and a memory 18. The optical pick-up unit 12 is capable of outputting laser beams with different powers onto an optical disk according to different driving voltages. For example, the optical pick-up unit 12 is capable of outputting a bias power Pb, an erase power Pe, and a write power Pw. The power control unit 14 controls the output power of the optical pick-up unit 12. For example, during an erasing operation, the power control unit 14 supplies an appropriate driving voltage to the optical pick-up unit 12, so as to control the optical pick-up unit 12 to output the erase power Pe. The controller 16 executes the firmware 20 stored in the memory 18 to control the entire operation of the CD-RW drive 10. For example, during a data writing operation, the controller 16 outputs control signals to the power control unit 14, so as to drive the power control unit 14 to supply the appropriate driving voltage to the optical pick-up unit 12. In practical application, the CD-RW drive 10 uses a write strategy to control the output power of the optical pick-up unit 12 for burning marks corresponding to the EFM data onto a CD-RW disk correctly. The write power Pw and the bias power Pb are alternately outputted from the optical pick-up unit 12 to burn marks with specific lengths (corresponding to the amorphous state) to store a predetermined logic value on the CD-RW disk.

As is well known in the art, a 1T write strategy is usually used for a low-speed data writing operation, such as 16x (x means writing speed), to store the EFM data. In a base period (1T) of the EFM clock, the optical pick-up unit 12 may output the write power Pw once. However, as the burning technology of the optical storage device increases, more and more CD-RW drives with higher writing speeds appear (for example, CD-RW drives of 32x or 48x writing speed), the EFM base period has become shorter and shorter so that time in the base period (1T) for outputting the base power Pb after the optical pick-up unit 12 outputs the write power Pw is not long enough to cool the phase-change materials to record the logic value. Therefore, high-speed writing operation may have problems such as insufficient time for outputting the base power and cooling the phase-change materials, and may even result in data errors.

In order to solve the problems of the 1T write strategy, the prior art develops a 2T write strategy. Please refer to FIG. 2 and FIG. 3. FIG. 2 is a schematic diagram of using a 2T write strategy to form an even mark according to the prior art, and FIG. 3 is a schematic diagram of using a 2T write strategy to form an odd mark according to the prior art. As is well known in the art, the EFM data is transformed into marks with different lengths and stored on a CD-RW disk. According to the specification (Orange Book Part III, Volume 3), when the 2T write strategy is used, the marks with different lengths include even marks and odd marks. The even marks include a 2T mark, a 4T mark, a 6T mark, an 8T mark and a 10T mark. The odd marks include a 3T mark, a 5T mark, a 7T mark, a 9T mark and an 11T mark.

As shown in FIG. 2, when the controller 16 uses the 2T write strategy to form a 10T mark on a CD-RW disk, the controller 16 has to drive the power control unit 14, and the power control unit 14 subsequently drives the optical pick-up unit 12 to output the erase power Pe. The controller 16 then drives the power control unit 14 at time t to set the optical pick-up unit 12 to continuously output the write power Pw during a writing period Tmn. Following that, the controller 16 drives the power control unit 14 to set the optical pick-up unit 12 to output the bias power Pb. Obviously, the optical pick-up unit 12 outputs the write power Pw to heat the phase-change materials in the CD-RW disk, and the phase-change materials is cooled when the optical pick-up unit 12 varies to output the bias power Pb. As illustrated in the waveform shown in FIG. 2, the optical pick-up unit 12 continuously outputs the write power Pw during the writing period Tmn in each 2T period. After the optical pick-up unit 12 completes to output the write power Pw during the writing period Tmn at the last 2T period (8T-10T), the controller 16 drives the power control unit 14 to set the optical pick-up unit 12 to output the bias power Pb during a cooling period $T_{c1}$. Thereafter, the controller 16 drives the power control unit 14 to set the optical pick-up unit 12 to output the erase power Pe to complete the formation of the 10T mark. Methods for forming other even marks are similar to the method for forming the 10T mark. Take a 4T mark as an example, after two outputs of the write power Pw in the period of 0-4T, the optical pick-up unit 12 subsequently outputs the bias power Pb during the cooling period $T_{c1}$ and then outputs the erase power Pe to complete the formation of the 4T mark.

As shown in FIG. 3, when the 2T write strategy is applied to form an 11T mark on a CD-RW disk, the controller 16 has to drive the power control unit 14, and the power control unit 14 subsequently drives the optical pick-up unit 12 to output the erase power Pe. The controller 16 then drives the power control unit 14 at time t to set the optical pick-up unit 12 to continuously output the write power Pw during a writing period Tmn. Following that, the controller 16 drives the power control unit 14 to set the optical pick-up unit 12 to output the bias power Pb. Obviously, the optical pick-up unit 12 outputs the write power Pw to heat the phase-change materials in the CD-RW disk, and the phase-change materials is cooled when the optical pick-up unit 12 varies to output the bias power Pb. As shown in FIG. 3, except in the last three base periods (9T-11T), the optical pick-up unit 12 continuously outputs the write power Pw during the writing period Tmn in each 2T period. After the optical pick-up unit 12 completes the output of the write power Pw during the last writing period Tmn in the period of 6T-8T, the controller 16 drives the power control unit 14 at time t' to set the optical pick-up unit 12 to continuously output the write power Pw during a writing period $Tmn^+$. Following that, the controller 16 drives the power control unit 14 to set the optical pick-up unit 12 to output the bias power Pb during a cooling period $T_{c2}$. Finally, the controller 16 drives the power control unit 14 to set the optical pick-up unit 12 to output the erase power Pe to complete the formation of the 11T mark. Methods for forming other odd marks are similar to the method for forming the 11T mark. Take a 5T mark as an example, after an output of the write power Pw in the time period of 0-2T, the optical pick-up unit 12 subsequently outputs another write power Pw during the following 3T period. Then, the optical pick-up unit 12 outputs the bias power Pb during the cooling period $T_{c2}$ and then outputs the erase power Pe to complete the formation of the 5T mark.

According to the 2T write strategy described above, the write power Pw is used to heat the CD-RW disk once in each 2T period. Therefore, the time interval between two heating operations using the writing power Pw is enough to cool the phase-change materials and transform the phase-change materials into the amorphous state at high-speed writing operation. For the odd mark and the even mark, the heating period thereof is corresponding to the same value. As a result, the heating periods Tmn and $Tmn^+$ may be long enough for the portion of the phase-change materials in a first predetermined length (the odd mark) to be transformed uniformly into the amorphous state, but the heating period Tmn is not long enough for the portion of the phase-change materials in a second predetermined length (the even mark) to be transformed uniformly into the amorphous state. In other words, when the optical pick-up unit 12 reads the marks recorded on the CD-RW disk, the RF signals associated with the odd mark may form a better waveform, and the RF signals associated with the even mark may form an improper waveform. Similarly, when forming the even mark, the heating period Tmn may uniformly transform the portion of the phase-change materials with a first predetermined length into the amorphous state. However, when forming the odd mark, the same heating period Tmn and the adjustable heating period $Tmn^+$ may not uniformly transform the portion of the phase-change materials with a second predetermined length into the amorphous state. In other words, when the optical pick-up unit 12 reads the marks recorded on the CD-RW disk, the RF signals associated to the even mark may form a better waveform, and the RF signals associated to the odd mark may form an improper waveform.

To sum up the 2T write strategy as mentioned in the above paragraphs, the heating period Tmn for forming the odd mark and the heating period Tmn for forming the even mark are referred to the same value according to the prior art, and the heating period $Tmn^+$ is only used for forming the odd mark. Therefore, the heating period Tmn, which forms the odd mark with high recording quality, does not certainly form the even mark with high recording quality. Similarly, the heating period Tmn, which forms the even mark with high recording quality, does not certainly form the odd mark with high recording quality. As a result, it is not easy for the CD-RW drive 10 to form both of the odd mark and the even mark with high recording quality using the prior art 2T write strategy.

SUMMARY OF INVENTION

The claimed invention provides a method and a CD-RW drive capable of modifying a 2T write strategy to improve recording quality and solve the problems mentioned above.

According to one preferred embodiment of the claimed invention, the method for modifying a 2T write strategy on an optical disk drive includes: (a) forming a test odd mark and a test even mark on an optical disk; (b) detecting signal waveforms associated with the test odd mark and the test even mark; and (c) when a first timing offset is detected between a timing occurring the maximum signal strength in the signal waveform associated with the test even mark and a timing occurring the maximum signal strength in a first ideal waveform, adjusting a plurality of writing periods used for forming an even mark according to the first timing offset; and when a second timing offset is detected between a timing occurring the maximum signal strength in the signal waveform associated with the test odd mark and a timing occurring the maximum signal strength in a second ideal waveform, adjusting a plurality of writing periods used for forming an odd mark according to the second timing offset.

According to another preferred embodiment of the claimed invention, the optical disk drive includes: an optical pick-up unit for outputting a laser beam to burn a plurality of odd marks and a plurality of even marks on an optical disk; and a controller connected to the optical pick-up unit, the controller being capable of driving the optical pick-up unit according to a 2T write strategy, and controlling the optical pick-up unit to use a plurality of writing periods having a length equal to at least triple a base period to output the laser beam to burn an odd mark and an even mark on the optical disk. The optical disk drive may be an ultra-high speed CD-RW drive and may further include a detector. The detector is connected to the controller and is capable of notifying the controller how to adjust the writing periods according to the information obtained from reading the odd marks and the even marks by the optical pick-up unit. A predetermined database is provided to enable the detector to notify the controller how to adjust the writing periods according to the deviation between the practical burning result and the most ideal burning result. The detector may also notify the controller how to adjust the writing periods according to the profiles and distributions of the odd marks and the even marks.

According to another preferred embodiment of the claimed invention, a calibration system for an optical disk drive includes: a detector for analyzing profiles and distributions of different marks recorded on an optical disk; and an adjuster connected to the detector and an optical pick-up unit (or connected to an optical disk drive), the adjuster being capable of adjusting a plurality of writing periods used by the optical pick-up unit (or the part used to control the writing periods by the optical pick-up unit) according to the information analyzed by the detector, the writing periods having a length equal to at least triple a base period and being used by the optical pick-up unit to output a laser beam for forming an odd mark and an even mark on the optical disk.

It is an advantage of the present invention that the lengths of the writing periods for forming the even mark and the odd mark can be independently set. Therefore, high recording quality for both of the even mark and the odd mark can be achieved by an appropriate setting of the writing periods.

These and other concepts of the claimed invention will be apparent to those of ordinary skill in the art after reading the following detailed description of the preferred embodiment that is illustrated in the various figures and drawings.

DETAILED DESCRIPTION

Figure 4:
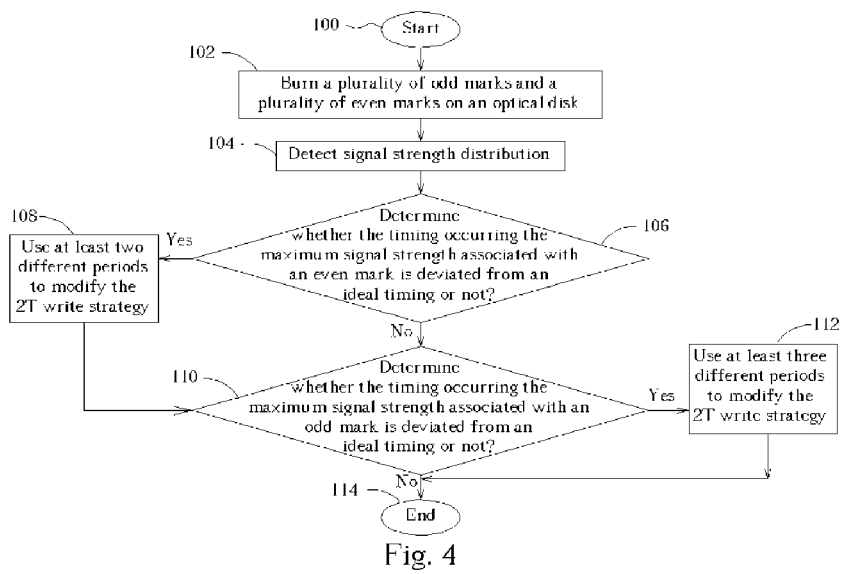
FIG. 4 is a flow chart of a method for modifying a 2T write strategy according to the present invention.

FIG. 4 is a flow chart of a method for modifying a 2T write strategy according to one embodiment of the present invention. The method includes the following steps:

Step 100: start;

Step 102: write a plurality of odd marks and a plurality of even marks on an optical disk according to a 2T write strategy;

Step 104: read the odd marks and the even marks, so as to detect the distributions of the signal strengths associated with the odd marks and the even marks;

Step 106: determine whether the timing occurring the maximum signal strength associated with an even mark is deviated from an ideal timing? If yes, go to the step 108; otherwise, go to the step 110;

Step 108: modify the 2T write strategy to reduce the deviation between the timing occurring the maximum signal strength and the ideal timing using at least two different periods;

Step 110: determine whether the timing occurring the maximum signal strength associated with an odd mark is deviated from an ideal timing? If yes, go to the step 112; otherwise, go to the step 114;

Step 112: modify the 2T write strategy to reduce the deviation between the timing occurring the maximum signal strength and the ideal timing using at least three different periods;

Step 114: end.

The present invention is not limited to modify the even mark prior to the odd mark. It is appreciated that the even mark can be modified after the modification of the odd mark. Therefore, the steps 110 and 112 can be executed prior to the steps 106 and 108. The even marks include a 2T mark, a 4T mark, a 6T mark, an 8T mark, a 10T mark and etc. The even marks are considered deviated from the ideal timing if one of these marks is deviated from its corresponding ideal timing. Similarly, the odd marks include a 3T mark, a 5T mark, a 7T mark, a 9T mark, an 11T mark and etc, and the odd marks are considered deviated from the ideal timing if one of these marks is deviated from its corresponding ideal timing.

Figure 1:
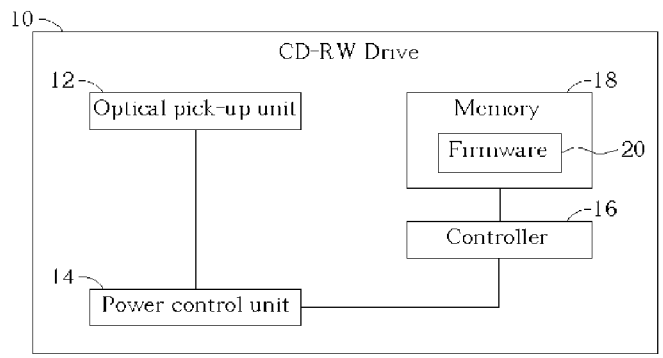
FIG. 1 is a function block diagram of a CD-RW drive according to the prior art.
Figure 2:
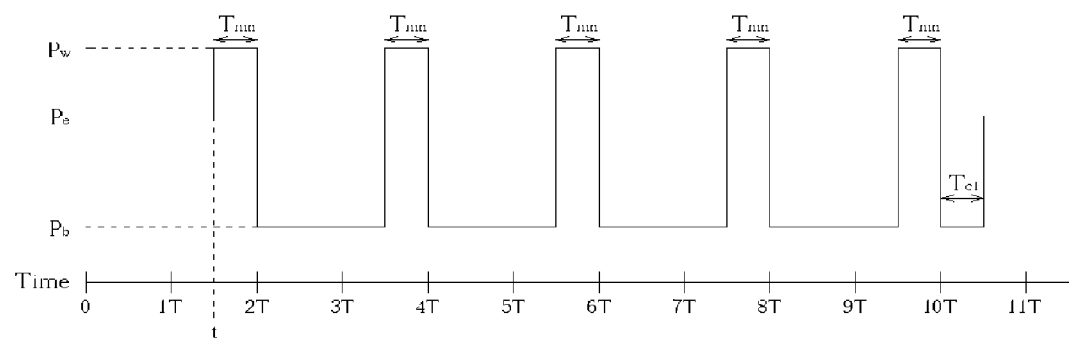
FIG. 2 is a schematic diagram of using a 2T write strategy to form an even mark according to the prior art.
Figure 3:
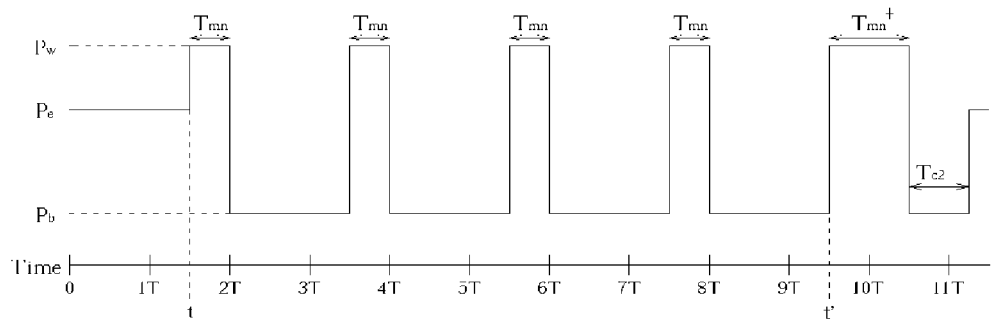
FIG. 3 is a schematic diagram of using a 2T write strategy to form an odd mark according to the prior art.

The method for modifying the 2T write strategy according to the present invention can be applied in the CD-RW drive 10, such as an ultra-high speed CD-RW drive, as shown in FIG. 1. The functions and operation of the CD-RW drive 10 are described in the section entitled Background of Invention and thus not repeated here. The operation of modifying the 2T write strategy according to the present invention is described as below. When the 2T write strategy modification is applied in the CD-RW drive 10 according to the present invention, the controller 16 executes the firmware 20 to write data onto an optical disk. In this case, the controller 16 follows a predetermined 2T write strategy (such as the prior 2T write strategy illustrated in FIG. 2 and FIG. 3) to control the power control unit 14, and thus enable the power control unit 14 to drive the optical pick-up unit 12 to burn a plurality of odd marks (such as a 5T mark, a 7T mark, a 9T mark and an 11T mark) and a plurality of even marks (such as a 4T mark, a 6T mark, an 8T mark and a 10T mark), as is indicated by the step 102. These odd marks and even marks are used as test marks according to the present invention.

Figure 5:
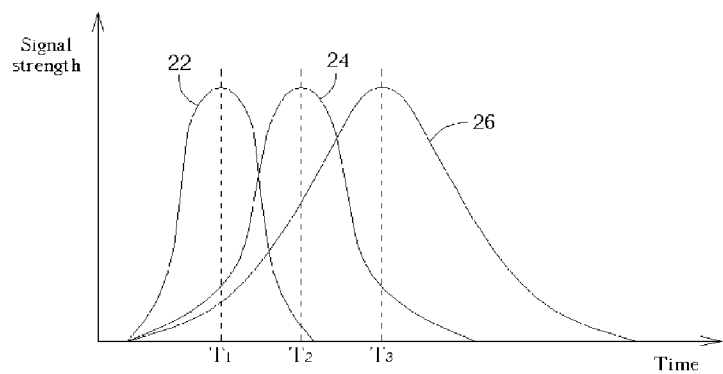
FIG. 5 is a schematic diagram of signal strength distribution of a mark according to the present invention.

Following that, the optical pick-up unit 12 reads the odd marks and the even marks, so as to record the signal strength distribution characteristics of these marks. FIG. 5 is a schematic diagram of a signal strength distribution of a mark according to the present invention. The horizontal axis in FIG. 5 represents time and the vertical axis therein represents signal strength. Three characteristic curves 22, 24 and 26 representing three possible signal strength distributions of the same mark are illustrated in FIG. 5. For example, the characteristic curve 24 can be an ideal characteristic curve of a 10T mark, and the maximum signal strength thereof arrives at the time T2. However, after reading the 10T mark, the characteristic curve 22 is detected and has a lasting period shorter than the lasting period of the ideal characteristic curve 24. The maximum signal strength of the 10T mark is detected at the time T1. The characteristic curve 22 is deviated from the ideal characteristic curve 24, and the time T1 for actually occurring the maximum signal strength is prior to the time T2 for ideally occurring the maximum signal strength. Therefore, when the 10T mark is associated with the characteristic curve 22, the recording time for forming the 10T mark is too short. In other words, if the 10T mark is recorded on the optical disk according to the 2T write strategy illustrated in FIG. 2, the writing period Tmn is too short and thus results in the 10T mark being associated with the characteristic curve 22. On the contrary, after reading the 10T mark, the characteristic curve 26 is detected and has a lasting period longer than the lasting period of the ideal characteristic curve 24. The maximum signal strength of the 10T mark is detected at the time T3. The characteristic curve 26 is deviated from the ideal characteristic curve 24, and the time T3 for actually occurring the maximum signal strength is later than the time T2 for ideally occurring the maximum signal strength. Therefore, when the 10T mark is associated with the characteristic curve 26, the recording time for forming the 10T mark is too long. In other words, if the 10T mark is recorded on the optical disk according to the 2T write strategy illustrated in FIG. 2, the writing period Tmn is too long and thus results in the 10T mark being associated with the characteristic curve 26.

As mentioned in the above paragraph, the method for modifying the 2T write strategy according to the present invention uses the signal strength distribution associated with each mark to determine whether it is required to adjust the lasting period for outputting the writing power. Therefore, the present invention detects the timing occurring the maximum signal strength associated with an even mark and checks whether this timing is deviated from the ideal timing (the step 106). If a timing offset is detected between the timing occurring the maximum signal strength associated with the even mark and the ideal timing, the lasting period for outputting the write power is necessarily adjusted to approach the timing occurring the maximum signal strength to its ideal timing (the step 108). More specifically, when the even mark is associated with the characteristic curve 22 shown in FIG. 5, the present invention adjusts the lasting period for outputting the write power, so as to increase the total recording time for forming the even mark according to the 2T write strategy. On the contrary, when the even mark is associated with the characteristic curve 26 shown in FIG. 5, the present invention adjusts the lasting period for outputting the write power, so as to reduce the total recording time for forming the even mark according to the 2T write strategy.

It is also possible that the characteristic curves shown in FIG. 5 are not (or not only) deviated at the timing occurring the maximum signal strength. It is possible that the characteristic curves may become wider or narrower than the ideal characteristic curve. In this kind of situation, not only the lasting period for outputting the write power but also other reasons such as improper laser power or depths of focus are possible to result in the deviation in the characteristic curves. Therefore, methods such as try and error are used to adjust the total recording time for forming the mark and find out the most suitable lasting period for outputting the write power.

Figure 6:
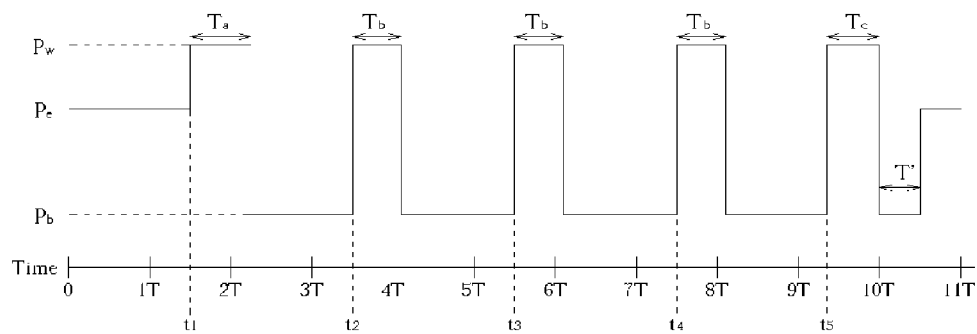
FIG. 6 is a schematic diagram of using a 2T write strategy to form an even mark according to the present invention.

FIG. 6 is a schematic diagram of using a 2T write strategy to form an even mark according to the present invention. As is well known in the art, the even marks include a 2T mark, a 4T mark, a 6T mark, an 8T mark and a 10T mark. A 10T mark is illustrated in FIG. 6. When the controller 16 uses the 2T write strategy to form the 10T mark on an optical disk, the controller 16 has to drive the power control unit 14, and the power control unit 14 subsequently drives the optical pick-up unit 12 to output the erase power Pe. The controller 16 then drives the power control unit 14 at time t1 to set the optical pick-up unit 12 to continuously output the write power Pw during a writing period Ta. Following that, the controller 16 drives the power control unit 14 to set the optical pick-up unit 12 to output the bias power Pb. Obviously, the optical pick-up unit 12 outputs the write power Pw to heat the phase-change materials in the CD-RW disk, and the phase-change materials is cooled when the optical pick-up unit 12 varies to output the bias power Pb. Thereafter, the controller 16 drives the power control unit 14 at time t2 to set the optical pick-up unit 12 to continuously output the write power Pw during a writing period Tb. Following that, the controller 16 drives the power control unit 14 to set the optical pick-up unit 12 to output the bias power Pb. Still as shown in FIG. 6, the controller 16 then drives the power control unit 14 at time t3 and t4 to set the optical pick-up unit 12 to continuously output the write power Pw during the time periods Tb. The optical pick-up unit 12 completes four heating operations during the time period of 0-8T, and will execute the last heating operation during the time period of 8T-10T according to the 2T write strategy. The controller 16 then drives the power control unit 14 at time t5 to set the optical pick-up unit 12 to output the write power Pw during a writing period Tc. Finally, the optical pick-up unit 12 outputs the bias power Pb during a cooling period T', and thereafter, the controller 16 drives the power control unit 14 to set the optical pick-up unit 12 to output the erase power Pe to complete the formation of the 10T mark.

The writing periods Ta, Tb and Tc are adjustable to have different values from one another. FIG. 6 illustrates a waveform of the output power outputted from the optical pick-up unit 12 for forming the 10T mark. Methods for forming other even marks are similar to the method for forming the 10T mark. Take a 4T mark as an example, after the output of the write power Pw in the time period of 0-2T (the lasting period for outputting the write power Pw is Ta), the optical pick-up unit 12 outputs another write power Pw during the time period of 2T-4T (the lasting period for outputting the write power is Tc). Subsequently, the optical pick-up unit 12 outputs the bias power Pb during the cooling period T', and then outputs the erase power Pe to complete the formation of the 4T mark.

When the 10T mark is associated with the characteristic curve 22 shown in FIG. 5, the present invention adjusts the heating periods Ta, Tb and Tc. For example, the heating periods Ta, Tb and Tc may be all increased to lengthen the recording time for forming the 10T mark. Alternatively, the heating time Tb may be maintained at the same value and the heating periods Ta, Tc are increased to lengthen the recording time for forming the 10T mark. After the recording time for forming the 10T mark is lengthened, the signal power distribution associated with the 10T mark approaches the ideal characteristic curve 24 to obtain better recording quality. In addition, when the 10T mark is associated with the characteristic curve 26 shown in FIG. 5, the present invention adjusts the heating periods Ta, Tb and Tc. For example, the heating periods Ta, Tb and Tc may be all reduced to shorten the recording time for forming the 10T mark. Alternatively, the heating time Tb may be maintained at the same value and the heating periods Ta, Tc are reduced to shorten the recording time for forming the 10T mark.

After the recording time for forming the 10T mark is shortened, the signal power distribution associated with the 10T mark approaches the ideal characteristic curve 24 to obtain better recording quality.

Similarly, the present invention detects the timing occurring the maximum signal strength associated with an odd mark and checks whether this timing is deviated from the ideal timing (the step 110). If a timing offset is detected between the timing occurring the maximum signal strength associated with the odd mark and the ideal timing, the lasting period for outputting the write power is necessarily adjusted to approach the timing for occurring the maximum signal strength to its ideal timing (the step 112). More specifically, when the odd mark is associated with the characteristic curve 22 shown in FIG. 5, the present invention adjusts the lasting period for outputting the write power, so as to increase the total recording time for forming the odd mark according to the 2T write strategy. On the contrary, when the odd mark is associated with the characteristic curve 26 shown in FIG. 5, the present invention adjusts the lasting period for outputting the write power, so as to reduce the total recording time for forming the odd mark according to the 2T write strategy.

Figure 7:
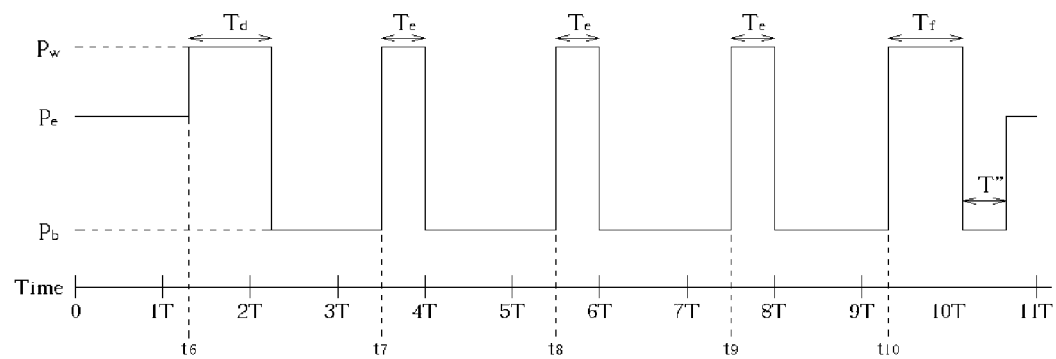
FIG. 7 is a schematic diagram of using a 2T write strategy to form an odd mark according to the present invention.

FIG. 7 is a schematic diagram of using a 2T write strategy to form an odd mark according to the present invention. As is well known in the art, the odd marks include a 3T mark, a 5T mark, a 7T mark, a 9T mark and an 11T mark. An 11T mark is illustrated in FIG. 7. When the controller 16 uses the 2T write strategy to form the 11T mark on an optical disk, the controller 16 has to drive the power control unit 14, and the power control unit 14 subsequently drives the optical pick-up unit 12 to output the erase power Pe. The controller 16 then drives the power control unit 14 at time t6 to set the optical pick-up unit 12 to continuously output the write power Pw during a writing period Td. Following that, the controller 16 drives the power control unit 14 to set the optical pick-up unit 12 to output the bias power Pb. Thereafter, the controller 16 drives the power control unit 14 at time t7 to set the optical pick-up unit 12 to continuously output the write power Pw during a writing period Te. Following that, the controller 16 drives the power control unit 14 to set the optical pick-up unit 12 to output the bias power Pb. Still as shown in FIG. 7, the controller 16 then drives the power control unit 14 at time t8 and t9 to set the optical pick-up unit 12 to continuously output the write power Pw during the time periods Te. The optical pick-up unit 12 completes four heating operations during the time period of 0-8T, and will execute the last heating operation during the time period of 8T-11T according to the 2T write strategy. The controller 16 then drives the power control unit 14 at time t10 to set the optical pick-up unit 12 to output the write power Pw during a writing period Tf. Finally, the optical pick-up unit 12 outputs the bias power Pb during a cooling period T", and thereafter, the controller 16 drives the power control unit 14 to set the optical pick-up unit 12 to output the erase power Pe to complete the formation of the 11T mark.

The writing periods Td, Te and Tf are adjustable to have different values from one another. FIG. 7 illustrates a waveform of the output power outputted from the optical pick-up unit 12 for forming the 11T mark. Methods for forming other odd marks are similar to the method for forming the 11T mark. Take a 5T mark as an example, after the output of the write power Pw in the time period of 0-2T (the lasting period for outputting the write power Pw is Td), the optical pick-up unit 12 outputs another write power Pw during the time period of 2T-5T (the lasting period for outputting the write power is Tf). Subsequently, the optical pick-up unit 12 outputs the bias power Pb during the cooling period T", and then outputs the erase power Pe to complete the formation of the 5T mark.

When the 11T mark is associated with the characteristic curve 22 shown in FIG. 5, the present invention adjusts the heating periods Td, Te and Tf. For example, the heating periods Td, Te and Tf may be all increased to lengthen the recording time for forming the 11T mark. Alternatively, the heating time Te may be maintained at the same value and the heating periods Td, Tf are increased to lengthen the recording time for forming the 11T mark. After the recording time for forming the 11T mark is lengthened, the signal power distribution associated with the 11T mark approaches the ideal characteristic curve 24 to obtain better recording quality. In addition, when the 11T mark is associated with the characteristic curve 26 shown in FIG. 5, the present invention adjusts the heating periods Td, Te and Tf. For example, the heating periods Td, Te and Tf may be all reduced to shorten the recording time for forming the 11T mark. Alternatively, the heating time Te may be maintained at the same value and the heating periods Td, Tf are reduced to shorten the recording time for forming the 11T mark. After the recording time for forming the 11T mark is shortened, the signal power distribution associated with the 11T mark approaches the ideal characteristic curve 24 to obtain better recording quality.

When the CD-RW drive 10 burns the odd mark and the even mark on the optical disk, the writing periods for forming the odd mark and the writing periods for forming the even mark can be adjusted independently according to the present invention. In other words, the optical pick-up unit 12 does not use the same writing period Tmn to form the odd mark and the even mark, as is done in the prior art. For example, when using the 2T write strategy of the prior art to form an even mark and an odd mark, two writing periods Tmn and Tmn$^+$ are required to output the write power onto the optical disk. However, using the method of the present invention to form an even mark, at least two different writing periods (for example, Ta=Tb, Tc) are required to output the write power onto the optical disk. In addition, using the method of the present invention to form an odd mark, at least three different writing periods (for example, Td, Te, Tf) are required to output the write power onto the optical disk. Therefore, when forming an even mark and an odd mark, at least three different writing periods (for example, Ta=Tb=Td=Te, Tc, Tf) are used to output the write power onto the optical disk according to the present invention. As a result, when writing an odd mark, the individual settings of the heating periods Ta, Tb, Tc can uniformly transform the portion of the phase-change materials with a first predetermined length into the amorphous state. In addition, when writing an even mark, the individual settings of the heating periods Td, Te, Tf can uniformly transform the portion of the phase-change materials with a second predetermined length into the amorphous state. In other words, when the optical pick-up unit 12 reads the marks recorded on the optical disk, both of the RF signals associated with the odd mark and the RF signals associated with the even mark have good waveform and thus facilitate correction and decoding computation to the data associated with the marks.

As shown in FIG. 6, the optical pick-up unit 12 starts to output the write power Pw at the time t2, t3, t4, and continuously outputs the write power Pw during the same writing periods Tb. Alternatively, the optical pick-up unit 12 may also start to output the write power Pw with different writing periods respectively at the time t2, t3, t4. For example, when using the optical pick-up unit 12 to form the 10T mark, the optical pick-up unit 12 may start to output the write power Pw with different writing periods respectively at the time t1, t2, t3, t4, t5. It is appreciated that writing periods in each 2T period may have different lengths, so as to form various even marks and improve the recording quality according to the present invention. Similarly, the optical pick-up unit 12 may also start to output the write power Pw with different writing periods respectively at the time t7, t8, t9, as shown in FIG. 7.

Figure 8:
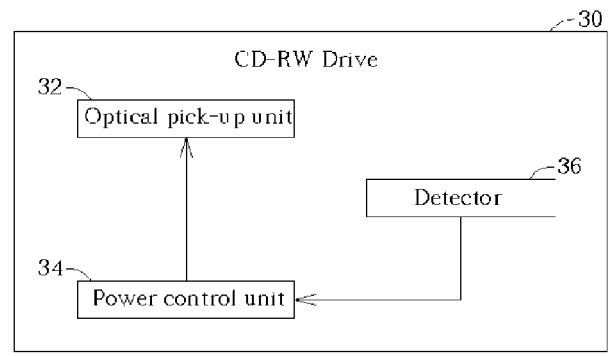
FIG. 8 is a schematic diagram of a CD-RW drive according to the present invention.

FIG. 8 is a schematic diagram of a CD-RW drive 30 according to the present invention. The CD-RW drive 30 is distinguished from a prior art optical disk drive by integrating a detector therein. The CD-RW drive 30 includes an optical pick-up unit 32, a power control unit 34 and a detector 36. The detector 36 is connected to the power control unit 34 and used to notify the power control unit 34 to modify the writing periods according to the information obtained by using the optical pick-up unit 32 to read the odd marks and even marks. A predetermined database can be provided to enable the detector 36 to notify the power control unit 34 how to modify the writing periods according to the difference between the practical recording result and the most ideal recording result. In addition, the detector 36 may also notify the power control unit 34 how to modify the writing periods according to the analysis of the profiles and distributions associated with the odd marks and the even marks. Obviously, the detector 36 and the power control unit 34 can be hardware, software or firmware.

Figure 9:
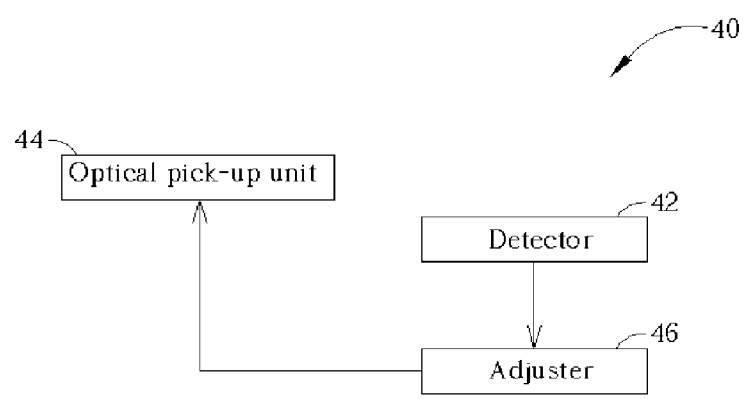
FIG. 9 is a schematic diagram of a calibration system for an optical disk drive according to the present invention.

In another embodiment of the present invention, the detector can be selectively not integrated into the optical disk drive. FIG. 9 is a schematic diagram of a calibration system 40 for an optical disk drive according to the present invention. The calibration system 40 includes a detector 42 for analyzing profiles and distributions of different marks recorded on an optical disk, an optical pick-up unit 44 installed in an optical disk drive, and an adjuster 46 connected to the detector 42 and the optical pick-up unit 44. The adjuster 46 is capable of adjusting a plurality of writing periods used by the optical pick-up unit 44 (or the part used to control the writing periods by the optical pick-up unit) according to the information analyzed by the detector 42. The writing periods may have a length equal to at least triple a base period and are used by the optical pick-up unit 44 to output a laser beam for forming an odd mark and an even mark on the optical disk. Obviously, the detector 42 and the adjuster 46 can be hardware, software or firmware.

In contrast to the prior art, the 2T write strategy of the present invention is capable of setting up the lengths of the writing periods for forming the even mark and the odd mark respectively. Therefore, high recording quality for both of the even mark and the odd mark can be achieved by an appropriate setting of the writing periods. As a result, when the optical pick-up unit reads the marks recorded on the optical disk, both of the RF signals associated with the odd mark and the RF signals associated with the even mark may have good waveform and thus facilitate correction and decoding computation to the data associated with the marks.

Those skilled in the art will readily observe that numerous modifications and alterations of the method and the device may be made while retaining the teachings of the invention. Accordingly, the above disclosure should be construed as limited only by the metes and bounds of the appended claims.

What is claimed is:

1. A method for modifying a 2T write strategy on an optical disk drive, the method comprising:

(a) forming a test odd mark and a test even mark on an optical disk;

(b) comparing a timing occurring the maximum signal strength in the signal waveform associated with the test even mark and a timing occurring the maximum signal strength in a first ideal waveform, and comparing a timing occurring the maximum signal strength in the signal waveform associated with the test odd mark and a timing occurring the maximum signal strength in a second ideal waveform; and (c) when a first timing offset is detected between the timing occurring the maximum signal strength in the signal waveform associated with the test even mark and the timing occurring the maximum signal strength in a first ideal waveform, adjusting a plurality of writing periods used for forming an even mark according to the first timing offset; and when a second timing offset is detected between the timing occurring the maximum signal strength in the signal waveform associated with the test odd mark and the timing occurring the maximum signal strength in a second ideal waveform, adjusting a plurality of writing periods used for forming an odd mark according to the second timing offset.

2. The method of claim 1 wherein the step (c) further comprises:

when forming the even mark on the optical disk, using a first writing period and a second writing period to output a write power, the first writing period and the second writing period having different lengths.

3. The method of claim 2 wherein the first writing period comprises a length for outputting the write power to the optical disk, and the second write period comprises a length for outputting a bias power to the optical disk.

4. The method of claim 1 wherein the step (c) further comprises:

when forming the even mark on the optical disk, using a first writing period, a second writing period and a third writing period to output a write power, the second writing period being between the first writing period and the third writing period, and the first writing period, the second writing period and the third writing period having different lengths.

5. The method of claim 4 wherein the first writing period comprises a length for outputting the write power to the optical disk, the second writing period comprises a length for once again outputting the write power to the optical disk, and the third writing period comprises a length for outputting a bias power to the optical disk.

6. The method of claim 1 wherein the step (c) further comprises:

when forming the even mark on the optical disk, using a first writing period, a plurality of second writing periods and a third writing period to output a write power, the plurality of the second writing periods being between the first writing period and the third writing period, each of the second writing periods being the same in length, and the first writing period, one of the second writing periods and the third writing period having different lengths.

7. The method of claim 6 wherein the first writing period comprises a length for outputting the write power to the optical disk, each of the second writing periods comprises a length for once again outputting the write power to the optical disk, and the third writing period comprises a length for outputting a bias power to the optical disk.

8. The method of claim 1 wherein the step (c) uses a firmware of the optical disk drive to set up the writing periods used for forming the odd mark and the even mark.

9. The method of claim 1 wherein the step (c) shortens the total lasting time of the writing periods used for forming the even mark when the timing occurring the maximum signal strength in the signal waveform associated with test even mark lags behind the timing occurring the maximum signal strength in the first ideal waveform, and the step (c) lengthens the total lasting time of the writing periods used for forming the even mark when the timing occurring the maximum signal strength in the signal waveform associated with the test even mark leads the timing occurring the maximum signal strength in the first ideal waveform.

10. The method of claim 1 wherein the step (c) further comprises:
when forming the odd mark on the optical disk, using a first writing period and a second writing period to output a write power, the first writing period and the second writing period having different lengths.

11. The method of claim 10 wherein the first writing period comprises a length for outputting the write power to the optical disk, and the second write period comprises a length for outputting a bias power to the optical disk.

12. The method of claim 1 wherein the step (c) further comprises:
when forming the odd mark on the optical disk, using a first writing period, a second writing period and a third writing period to output a write power, the second writing period being between the first writing period and the third writing period, and the first writing period, the second writing period and the third writing period having different lengths.

13. The method of claim 12 wherein the first writing period comprises a length for outputting the write power to the optical disk, the second writing period comprises a length for once again outputting the write power to the optical disk, and the third writing period comprises a length for outputting a bias power to the optical disk.

14. The method of claim 1 wherein the step (c) further comprises:
when forming the odd mark on the optical disk, using to a first writing period, a plurality of second writing periods and a third writing period to output a write power, the plurality of the second writing periods being between the first writing period and the third writing period, each of the second writing periods being the same in length, and the first writing period, one of the second writing periods and the third writing period having different lengths.

15. The method of claim 14 wherein the first writing period comprises a length for outputting the write power to the optical disk, each of the second writing period comprises a length for once again outputting the write power to the optical disk, and the third writing period comprises a length for outputting a bias power to the optical disk.

16. The method of claim 1 wherein the step (c) shortens the total lasting time of the plurality of the writing periods used for forming the odd mark when the timing occurring the maximum signal strength in the signal waveform associated with the test odd mark lags behind the timing occurring the maximum signal strength in the second ideal waveform, and the step (c) lengthens the total lasting time of the plurality of the writing periods used for forming the odd mark when the timing occurring the maximum signal strength in the signal waveform associated with the test odd mark leads the timing occurring the maximum signal strength in the second ideal waveform.

17. A calibration system for an optical disk drive comprising:
a detector for analyzing profiles and distributions of different marks recorded on an optical disk; and
an adjuster connected to the detector and an optical pick-up unit, the adjuster being capable of adjusting a plurality of writing periods used by the optical pick-up unit according to information analyzed by the detector, the writing periods being used by the optical pick-up unit to output a laser beam for forming an odd mark and an even mark on the optical disk;
wherein a rule adopted by the adjuster to adjust the plurality of the writing periods comprises:
when a characteristic curve of a mark reveals a maximum value prior to an ideal characteristic curve, increasing the total recording time for forming the mark;
when a characteristic curve of a mark reveals a maximum value later than an ideal characteristic curve, reducing the total recording time for forming the mark; and
when a characteristic curve of a mark becomes wider or narrower than an ideal characteristic curve, adjusting the total recording time for forming the mark according to a try-and-error method.

* * * * *